Patented Feb. 21, 1950

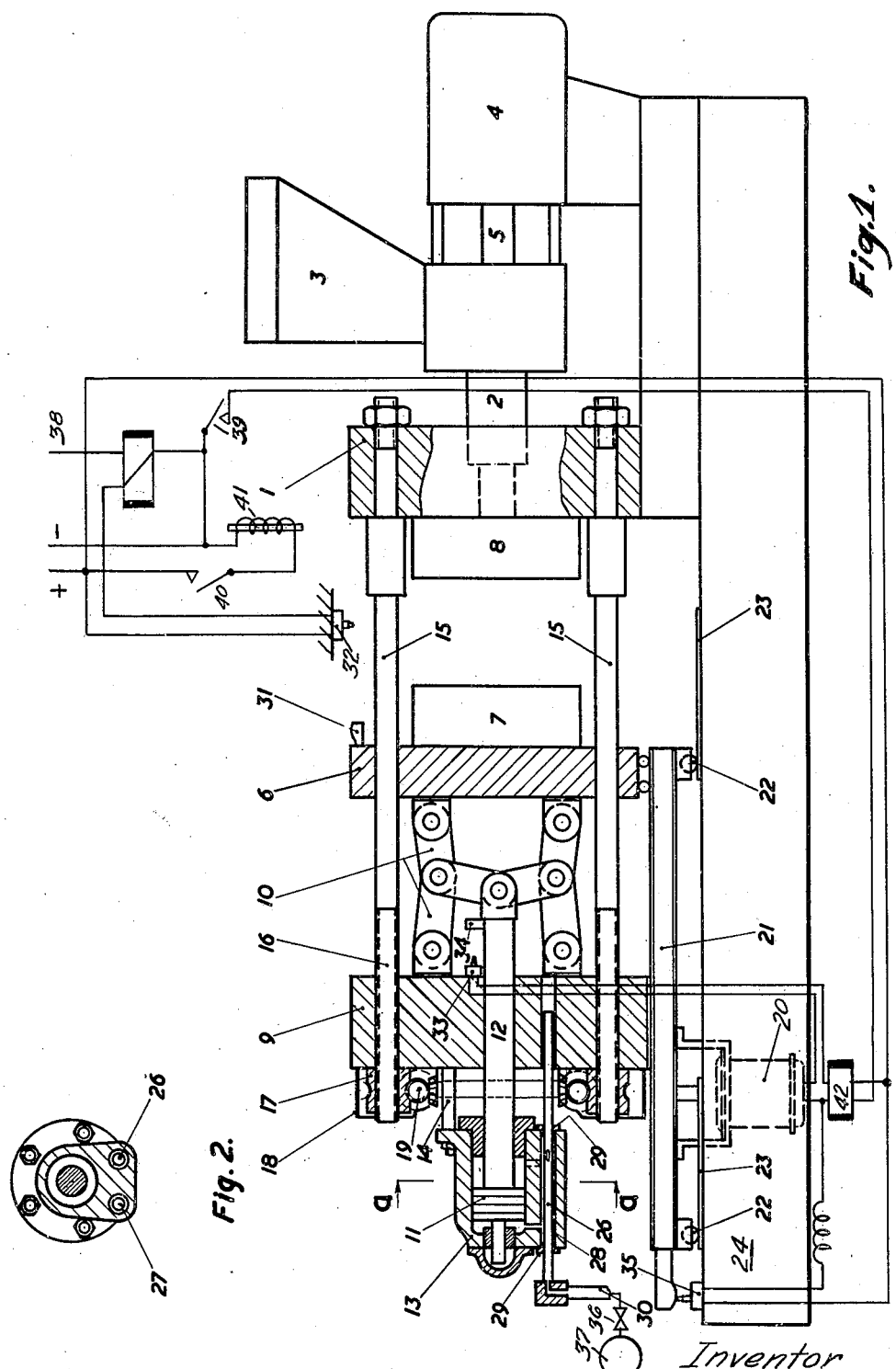

2,498,264

UNITED STATES PATENT OFFICE 2,498,264

INJECTION MOLDING MACHINE

Franz Karl Goldhard, London, England

Application June 19, 1945, Serial No. 600,313
In Great Britain June 29, 1944

7 Claims. (Cl. 18—30)

This invention relates to injection moulding machines for plastic materials and more particularly thermoplastic or thermosetting materials, and has for its main object to provide improved mechanism for the purpose of clamping the die plates together during the period of injecting plastic material into the mould.

To obtain good mechanical proportion of the moulded parts, very high injection pressures are often required, especially for materials of high viscosity. While to produce high injection pressures in the order of 20 tons/sq. in. and more, on a comparatively small plunger area presents no particular difficulty it is obvious that the corresponding pressure required to hold the die plates closed becomes excessively high where comparatively large projected areas of the mould cavities are concerned. Thus, through the limitations in the sizes of presses available, only very limited areas can be moulded.

The object of the present invention is to provide an injection moulding machine in which the movable die plate is caused to approach to and be retracted from the fixed die plate by fast moving driving means of low power, whilst for the last short part of the closing operation and for clamping the die plates together during the injection period, a mechanism of very high pressure ratio, requiring low power only owing to its short stroke, is employed.

In the injection moulding machine according to the invention, a movable die plate is connected with a movable thrust plate, both plates together being quickly moved to, and retracted from, an adjustably set position; the thrust plate being locked at the end of the quick approach stroke for the purpose of taking up the thrust during the subsequent slow closing operation of the movable die plate.

For the quick movements preferably mechanical driving means, e. g. gearing or screw drive driven by an electric motor, is used according to the invention. Alternatively, hydraulic means such as known piston and plunger devices or equivalent hydraulic power mechanisms, for example a rotary fluid motor may be used. The locking being effected either by special locking devices, or by using driving means of a self-locking type. For the slow moving, high pressure die closing and clamping preferably a hydraulically or mechanically operated lever arrangement is applied, e. g. a toggle mechanism of high ratio and short stroke. The actual closing pressure obtained by such a mechanism may be governed by means of an adjustable control arrangement, causing the stopping and locking of the quick approach drive, thus varying the elongation of the tie rods, as explained later.

In order that the nature and the performance of the invention may be more readily understood reference will now be made to the accompanying drawings, wherein:

Fig. 1 shows by way of example a partly sectional diagrammatical front elevation and Fig. 2 a partial section along the line A—A of an injection moulding machine constructed according to this invention.

In this machine mounted on a suitable bed and being, generally speaking, of a familiar construction, the fixed die plate 1, the injection cylinder 2, the hopper 3, the hydraulic cylinder 4, with injection plunger 5, are only generally indicated and not shown in detail, as they are not part of this invention, and may be of any conventional type. The movable and fixed parts of the mould are indicated at 7 and 8 respectively. The movable die plate 6 is connected with the thrust plate 9 by means of a toggle lever mechanism shown diagrammatically at 10, which must be of a construction sufficiently strong to take up the very high clamping pressures for which the machine is designed. The toggle mechanism is actuated by a hydraulic piston 11 and piston rod 12. The hydraulic cylinder 13 is fixed by means of tension rods 14 to the thrust plate 9. Instead of the toggle mechanism shown any other equivalent arrangement may be used, e. g. purely hydraulic means. The main tie rods 15 are fixed to the die plate 1, are guided in the movable die plate and thrust plate, and have threaded portions 16 co-operating with the drive nuts 17, the latter being mounted in housings 18 fixed to the thrust plate 9. The nuts are driven by worm or spiral gears 19 and other intermediate gearing (not shown) from the motor 20. The thrust plate 9 with the hydraulic cylinder 13, drive arrangement, and movable die plate 6, are combined to form a single unit mounted on a carriage 21 which is provided with the rollers 22 for rolling on rails 23 of the bed 24. The movable die plate 6 is provided with rollers 25, or slides, to allow for its movement on the carriage 21. The movable hydraulic cylinder 13 is connected with the stationary control valve 36 and pump 37 (shown diagrammatically) by means of a flexible hose, flexible joints, or any other flexible connections. Preferably, a connection as shown in the drawing is used, consisting of two parallel tubes 26 and 27 (see Fig. 2) slidable in bores 28 of the cylinder, which are provided with stuffing boxes 29; one of the said tubes being connected with the front space, whilst the other is connected with the back space, of the cylinder. This arrangement has the advantage of being hydrostatically balanced so that, apart from frictional forces, no stress is placed on the fixed connections 30 by the movement of the carriage. The movable die plate 6 is provided with a cam or dog 31, adapted to operate a limit switch 32 controlling a relay 38 having contacts 39 in the circuit of the motor 20 for stopping the latter when the mould plates are just touching or a very small distance apart. The limit switch 32 or the relay 38 connected with it, can at the same time operate contact 40 for energizing a solenoid 41 operating the hydraulic valve 36 for the clamping cylinder. Said switch or relay can also control other circuits, e. g. for controlling the operation of the injection cylinder; heating or cooling circuit; or an automatic timer for a certain cycle of operations. After retracting the hydraulic clamping piston 11 the motor 20 may be reversed, either by a hand operated switch or a switch incorporated in the automatic timer. The return travel of the carriage 21 may be controlled by an adjustable limit switch 35 adapted to control an electrically operated change over switch 42 for reversing the motor 20, either immediately, or with a delay adjustable by means of a time switch. During the high pressure hydraulic operations, the carriage should always be at a standstill as otherwise its screw drive would be subjected to excessive wear. For this purpose a limit switch 33 is fixed on the thrust plate 9 which is connected in the circuit of the motor, or in the operating coil of the motor starter, in such a way that the motor can only be started when contact is made by a dog 34 mounted on the piston rod 12 on reaching the retracted position of the toggles. Thus, the threaded parts 16 of the tie rods 15 and the nuts are under high stress in a static condition only.

The actual clamping pressure obtained by a toggle mechanism as described above or an equivalent mechanism, is determined by the elongation of the tie rods 15, which is equal to the movement of the toggle ends, resting on the thrust plate, after closing the die plates. If the stroke of the clamping piston, and therefore of the toggle ends, is made invariable, the clamping pressure may be controlled by adjusting the position of the limit switch 32, or the cam operating it, as this controls the distance between the mould plates, when the carriage stops and where the toggles start to operate, thus controlling that part of the toggle movement which is used for actually straining the tie rods after closing the mould.

I claim:

1. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said thrust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and toward said first die plate, said high power means having an operative stroke which is limited to that necessary to effect elongation of said tie rods sufficient to set up the desired clamping pressure between the opposed die plates, said high power means comprising toggle mechanism, hydraulic means for operating said toggle mechanism, and means for interlocking said toggle mechanism with the low power means so that said toggle mechanism is operable only when the thrust plate is stationary and vice versa.

2. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said thrust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and towards said first die plate, said high power means having an operative stroke which is limited to that necessary to effect elongation of said tie rods sufficient to set up the desired clamping pressure between the opposed die plates, an electric motor drive for the low power means, and an adjustable limit switch for stopping said motor when said die plates are a predetermined distance apart.

3. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said thrust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and towards said first die plate, said high power means having an operative stroke which is limited to that necessary to effect elongation of said tie rods sufficient to set up the desired clamping pressure between the opposed die plates, said low power means including an electric motor drive and the high power means including hydraulic means, and limit switch means serving as an interlock to prevent simultaneous operation of said electric motor drive and said hydraulic means.

4. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said thrust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and towards said first die plate, said high power means having an operative stroke which is limited to that necessary to effect elongation of said tie rods sufficient to set up the desired clamping pressure between the opposed die plates, an adjustable tripping device to adjustably limit the stroke of the low power means and cause said low power means to stop in a self-locked position, and toggle mechanism for connecting the high power means to the movable die plate.

5. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said thrust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and towards said first die plate, said high power means having an operative stroke which is limited to that necessary to effect elongation of said tie rods sufficient to set up the desired clamping pressure between the opposed die plates, said tie rods being screw threaded and stationary, screw threaded drive nuts connected to said thrust plate and threadedly mounted on said tie rods when said nuts are rotated by said low power means, an adjustable tripping device for adjustably limiting the stroke of said low power means to cause said low power means to stop said drive nuts in a self-locking position on said screw threaded tie rods, and toggle mechanism for transmitting motion from the high power means to the movable die plate whereby the toggle mechanism is operated with an invariable stroke so that the closing of the dies is effected according to the elongation under tension of the tie rods in resisting the thrust of the high power means.

6. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said thrust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and towards said first die plate, said high power means having an operative stroke which is limited to that necessary to effect elongation of said tie rods sufficient to set up the desired clamping pressure between the opposed die plates, said movable thrust plate being driven by said low power means through mechanical means, said mechanical means being locked in its stopping position, and said high power means comprising hydraulically operated means for slowly closing the die plates under high pressure.

7. In an injection moulding machine for plastic materials, a first die plate, a plurality of elongated tie rod tension members each secured at one end to said first die plate and extending therethrough in parallel relation, a thrust plate movable along said tie rod members towards and away from said first die plate, low power means for moving said trust plate along said tie rod members and for securing such thrust plate immovably to said tie rod members in desired set position, a second die plate disposed between said first die plate and said thrust plate and movably interconnected with the latter, high power means for forcibly moving said second die plate away from said thrust plate and towards said first die plate, said high power means having an operative stroke which is limited to that necessary to effect elongation of said tie rods sufficient to set up the desired clamping pressure between the opposed die plates, said cylinder block having a pair of bores extending therethrough parallel to the cylinder, one bore communicating with one end of the cylinder and the other bore communicating with the other end of the cylinder, tubes connected to said pump and slidably mounted in said bores, said tubes having openings in their walls within the bores to provide communication between the interior of the tubes and said bores to connect said pump with the cylinder.

FRANZ KARL GOLDHARD.

REFERENCES CITED

The following references are of record in the file of this patent:

UNITED STATES PATENTS

| Number | Name | Date |
| --- | --- | --- |
| 2,088,134 | Haessler | July 27, 1937 |
| 2,112,343 | Lester et al. | Mar. 29, 1938 |
| 2,306,323 | Schoepflin | Dec. 22, 1942 |
| 2,335,807 | Smith | Nov. 30, 1943 |
| 2,355,613 | Wacker | Aug. 15, 1944 |
| 2,356,634 | Von Opel | Aug. 22, 1944 |
| 2,370,622 | Gastrow | Mar. 6, 1945 |